(12) United States Patent
Hua et al.

(10) Patent No.: US 10,596,595 B2
(45) Date of Patent: Mar. 24, 2020

(54) VIBRATION MOTOR

(71) Applicant: AAC Technologies Pte. Ltd., Singapore (SG)

(72) Inventors: Zixu Hua, Shenzhen (CN); Hongfu Xu, Shenzhen (CN); Jinquan Huang, Shenzhen (CN); Fanghua Ling, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 407 days.

(21) Appl. No.: 15/652,642

(22) Filed: Jul. 18, 2017

(65) Prior Publication Data
US 2018/0297069 A1    Oct. 18, 2018

(30) Foreign Application Priority Data
Apr. 14, 2017    (CN) .................... 2017 2 0397177 U

(51) Int. Cl.
| | | |
|---|---|---|
| *H02K 33/16* | (2006.01) | |
| *B06B 1/04* | (2006.01) | |
| *H02K 33/12* | (2006.01) | |

(52) U.S. Cl.
CPC ............. *B06B 1/045* (2013.01); *H02K 33/12* (2013.01); *H02K 33/16* (2013.01)

(58) Field of Classification Search
CPC .................... H02K 33/00–18; H02K 35/00–06
See application file for complete search history.

(56) References Cited

U.S. PATENT DOCUMENTS 10,170,967 B2 *    1/2019    Chai ..................... H02K 33/00

* cited by examiner

*Primary Examiner* — Ramon M Barrera
(74) *Attorney, Agent, or Firm* — IPro, PLLC; Na Xu

(57) ABSTRACT

A vibration motor, including: a shell having accommodating space, a driving device accommodated in the accommodating space, a vibrator, and an elastic component elastically supporting the vibrator; the elastic component includes a first fixing portion connected with the shell, a second fixing portion connected with the vibrator, and a deforming portion connecting the first fixing portion with the second fixing portion; the deforming portion includes at least two elastic arms and a bending portion connecting two adjacent elastic arms, the fixing portions move close to or away from each other under compression or stretching of the deforming portion, so that the vibrator vibrate along vibrating direction, a damping member is arranged at inner surface of the bending portion close to the two adjacent elastic arms. The present disclosure adopts a new elastic component, which can adjust system damping property while guaranteeing vibrator weight, so as to improve vibration performance.

8 Claims, 3 Drawing Sheets

VIBRATION MOTOR

TECHNICAL FIELD

The present disclosure relates to a vibration motor and, particularly, relates to a linear vibration motor vibrating along a horizontal direction.

BACKGROUND

With the development of electronic technologies, portable consumption electronic products such as cellphone, handheld game player, navigation device or handheld multimedia entertainment device and the like are becoming more and more popular. Generally, a vibration motor will be used for system feedback, such as call prompt, message prompt, navigation prompt of a cellphone, vibration feedback of a game player etc. Such widespread application requires high performance and long service life of the vibration motor.

In the prior art, a vibration motor normally includes a shell having accommodating space, a vibrator accommodated in the accommodating space and an elastic component respectively connected with the shell and the vibrator. The elastic component supports the vibrator to move reciprocally in the shell so as to generate vibration. In order to adjust damping property of the vibrator, a damping block is generally arranged between the elastic component and the vibrator. However, the vibrator of such a structure needs space for installation of the damping block. Therefore, in a certain extent, total weight of the vibrator is compromised, which influences vibration performance of the product.

Therefore, a new vibration motor is necessary to solve the above-mentioned problems.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will be further illustrated as follows with reference to the drawings.

Figure 1:
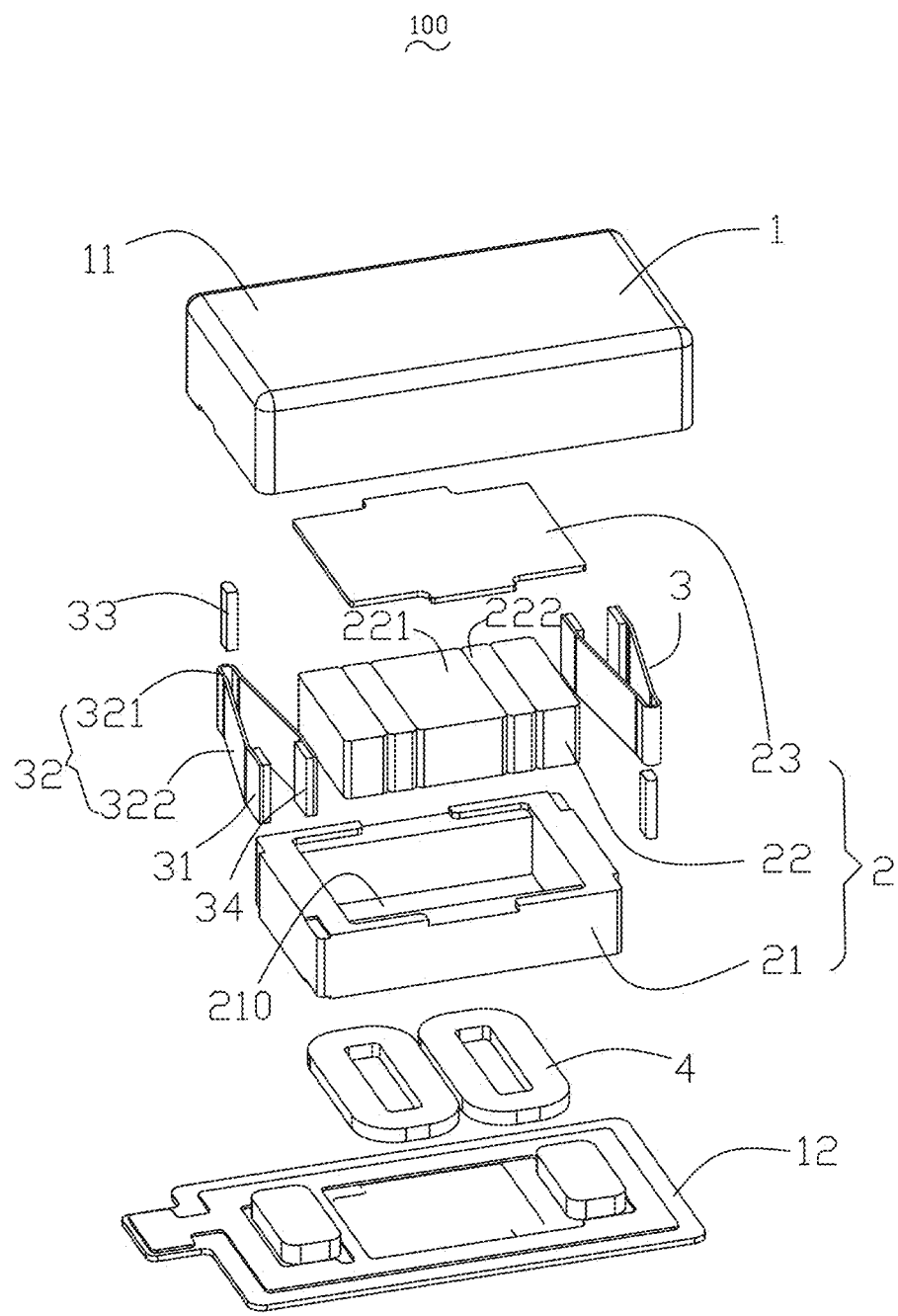
FIG. 1 is an exploded structural diagram of a vibration motor in accordance with an exemplary embodiment of the present disclosure.
Figure 2:
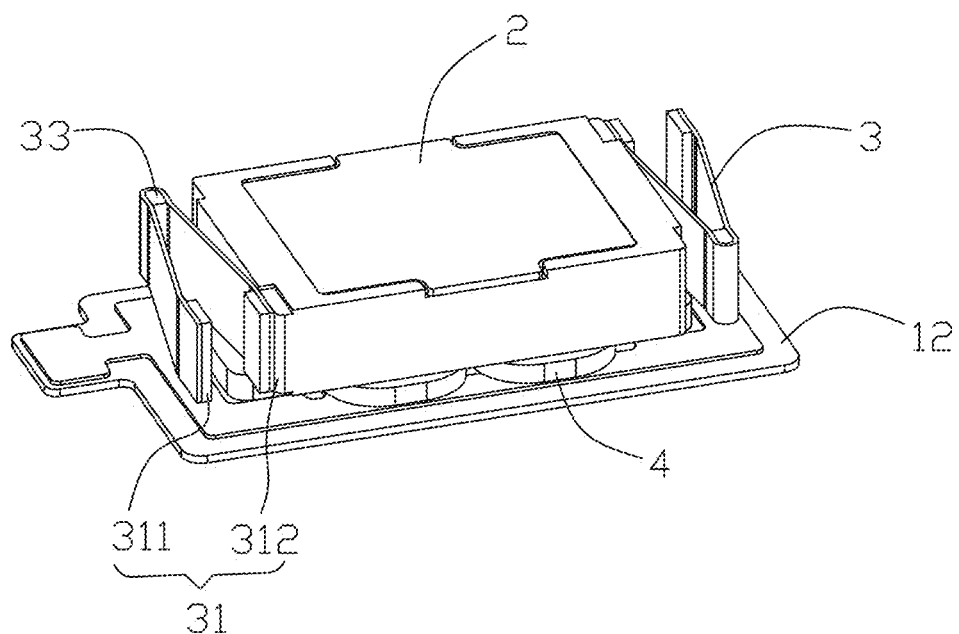
FIG. 2 is a partial assembled structural diagram of a vibration motor in accordance with an exemplary embodiment of the present disclosure.

As shown in FIG. 1 and FIG. 2, in an exemplary embodiment of the present disclosure, a vibration motor 100 includes a shell 1 having accommodating space, a vibrator 2 accommodated in the shell 1, an elastic component 3 elastically supporting the vibrator 2, and a driving device 4 driving the vibrator 2 to vibrate.

The shell 1 includes a cover plate 11 having a side wall and a bottom plate 12 which is connected with and covers on the cover plate 11 and forms accommodating space together with the cover plate 11. The driving device 4 is fixed on the bottom plate 12, and the elastic component 3 is fixed on the side wall of the cover plate 11. In an embodiment, the driving device 4 is a coil, the vibrator 2 is a magnetic vibrator having a magnet. In other alternative embodiments, it is also applicable that the driving device is a magnet, and the vibrator is provided with a coil, as long as the vibrator and the driving device can interact with each other so as to drive the vibrator to vibrate.

In an exemplary embodiment, the vibrator 2 includes a weight 21 and a magnet 22 arranged on the weight 21. Specifically, the weight 21 is provided with a through hole 210, the through hole 210 penetrate through the weight 21 along a direction perpendicular to a vibrating direction, and the magnet 22 is arranged in the through hole 210. The magnet 22 is arranged opposite to the coil. After the coil is energized, the magnet 22 and the coil interact with each other so as to drive the vibrator 2 to vibrate along a direction parallel to the bottom plate 12.

The magnet 22 includes a plurality of first magnets 221 arranged in interval and a plurality of second magnets 222 arranged between two adjacent first magnets 221. The second magnet 222 is symmetrically arranged with respect to the central axis of the coil. The first magnet 221 is a permanent magnet, the second magnet 222 can either be a permanent magnet having a magnetizing direction different from the first magnet, or the second magnet 222 may not be a permanent magnet, which only has the function of magnet conducting. Such a structure is for the sake of making the magnetic induction lines forming the magnetic field go through the coil maximally, so as to improve electromagnetic induction efficiency. Specifically, in an embodiment, there are three first magnets 221 in total, two second magnets 222 are clamped thereamong, the corresponding driving device 4 has two coils respectively arranged corresponding to the two second magnets 222. Further, the vibrator 2 also includes a magnetic conductive member 23 attached on the weight 21 and the magnet 22, which is used to gather the diverging magnetic induction lines, so as to improve magnetic induction intensity.

Figure 3:
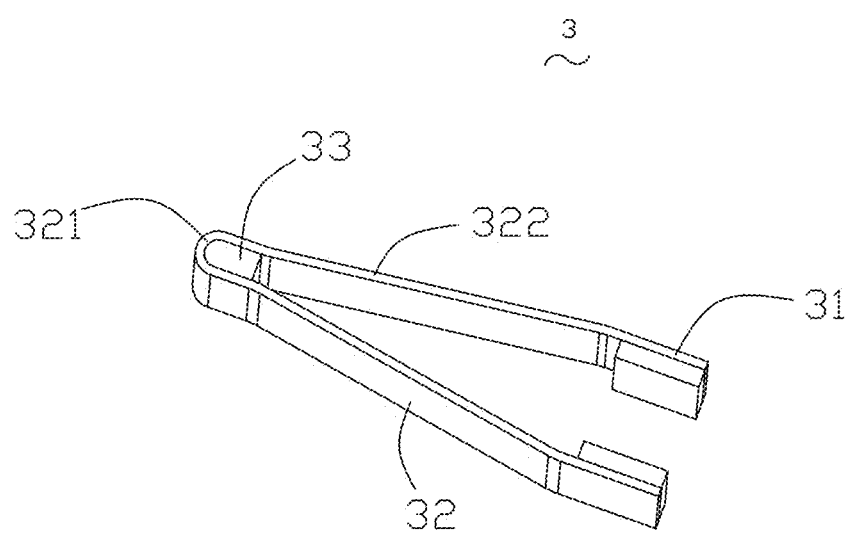
FIG. 3 is a structural schematic diagram of an elastic component of a vibration motor in accordance with an exemplary embodiment of the present disclosure.

Referring to FIG. 2 and FIG. 3, in an exemplary embodiment, there are three elastic components in total, which are respectively arranged at two sides of the weight 21. Specifically, each elastic component 3 respectively includes two fixing portions 31 and a deforming portion 32 connecting the two fixing portions 31. The two fixing portions 31 include a first fixing portion 311 connected with the shell 1 and a second fixing portion 312 connected with the weight 21. The fixing portions 31 move as the vibrator vibrates so as to be close to or away from each other, so that the elastic portion of the elastic component 3 deforms to provide a restoring force. The vibrator moves reciprocally along the vibrating direction.

Referring to FIG. 3, the deforming portion 32 includes at least one deformable bending portion 321 and at least two elastic arms 322 extended from the bending portion 321, and the elastic arm 322 is connected with the fixing portion 31 or with the adjacent bending portion 321. Specifically, in an embodiment, the elastic component is a V-shaped spring, the deforming portion 32 thereof includes a bending portion 321 and two elastic arms 322 connecting two sides of the bending portion with two fixing portion 31. In an embodiment, the bending portion 321 is shaped in a semi-circular arc structure. A damping member 33 is arranged in the inner surface of the bending portion 321 close to adjacent two elastic arms 322. When the vibration motor is vibrating, the elastic component 3 will press or release the damping member, so as to achieve the function of system damping adjustment.

Further, a buffer member 34 for collision avoidance is arranged between the first fixing portion 311 and the second fixing portion 312. The buffer member 34 normally adopts soft material such as foam and the like, which can avoid collision of the vibration motor when dropping off or during, over vibration so as to avoid product reliability from being influenced.

Optionally, bending directions of the bending portions 321 of the two elastic components 3 at two sides of the weight 21 are opposite to each other. In an embodiment, the two elastic components 3 at two sides are structured in central symmetry, that is, the fixing portions 31 of the two elastic component 3 are respectively fixed at two diagonal opposite corners of the weight 21 so as to prevent longitudinal shift of the weight 21 maximally, thereby guarantee vibration stability.

In other alternative embodiments, the elastic component 3 can also be of other shapes, such as an S-shaped spring. The deforming portion 32 has two or more bending portions 321, the opening directions of the adjacent two bending portions are opposite to each other, that is, the bending directions of the two adjacent bending portions are correspondingly arranged. At this time, the damping member can be arranged in the bending portion closest to the vibrator side, and can also be arranged in another one or more bending portions. Besides, the number of the elastic component 3 is not limited here. Specifically, the spring structure in the following embodiment can be referred to.

Figure 4:
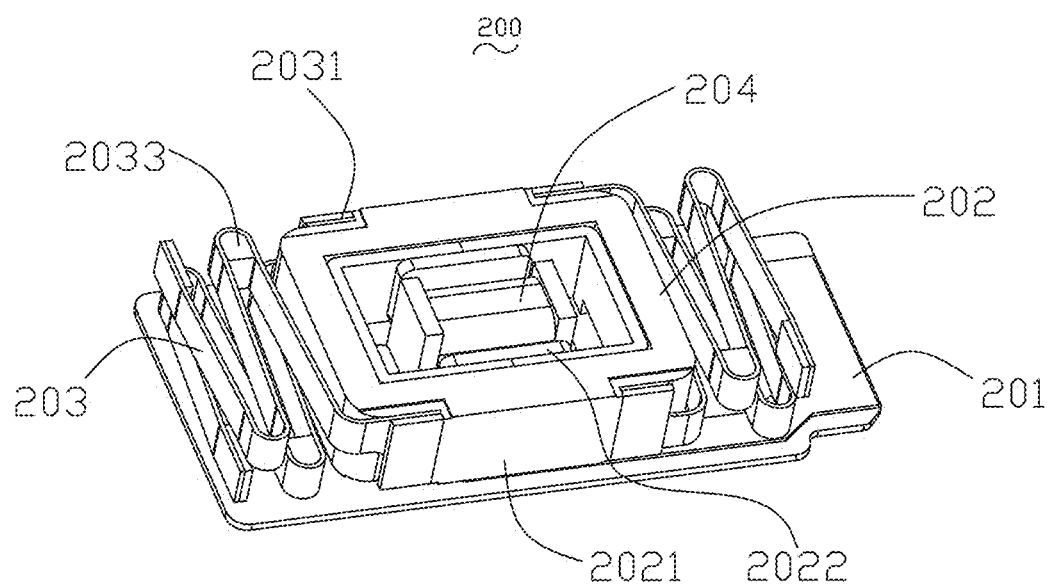
FIG. 4 is a partial assembled structural diagram of a vibration motor in accordance with an exemplary embodiment of the present disclosure.
Figure 5:
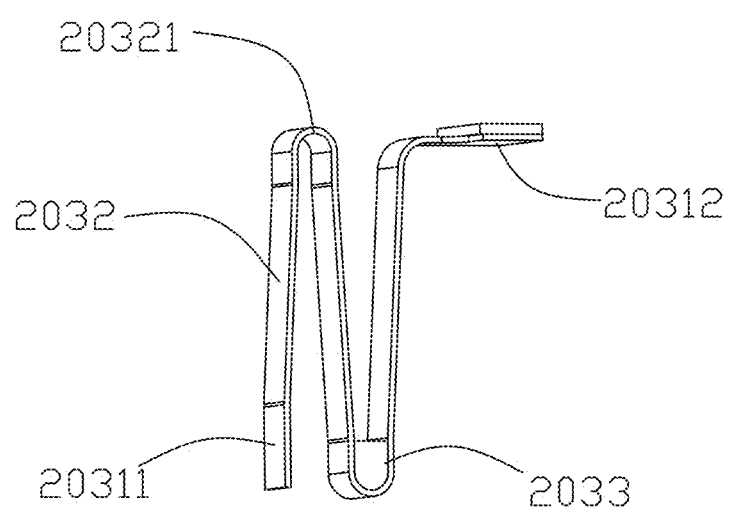
FIG. 5 is a structural schematic diagram of an elastic component of a vibration motor in accordance with an exemplary embodiment of the present disclosure.

As shown in FIG. 4 and FIG. 5, in another exemplary embodiment of the present disclosure, a vibration motor 200 includes a shell 201, a vibrator 202, an elastic component 203 elastically supporting the vibrator 202 to vibrate and a driving device 204 driving the vibrator 202 to vibrate.

In an embodiment, the driving device 204 is an electromagnet fixed on the shell 201, that is, includes a coil and an iron core used to fix the coil.

The vibrator 202 includes a weight 2021 and a magnet 2022 fixed on the weight 2021. The weight 2021 is provided with a through hole located at the center, the through hole penetrates through the weight 2021 along a direction perpendicular to a vibrating direction. The weight 2021 includes an inner wall defining the through hole, the magnet 2022 is fixed on the inner wall. The electromagnet is fixed on the shell and extends into the through hole to be arranged corresponding to the magnet 2022. The magnet 2022 drives the vibrator to vibrate under the electromagnet effect.

The elastic component 203 includes a first fixing portion 20311 and a second fixing portion 20312 respectively fixed with the shell 201 and the vibrator 202, and a deforming portion 2032 connecting the two fixing portions 2031. The fixing portions 2031 move as the vibrator vibrates so as to be close to or away from each other, so that the elastic portion of the elastic component 203 deforms to provide a restoring force, the vibrator moves reciprocally along the vibrating direction. In an embodiment, the elastic component 203 is an S-shaped spring, the deforming portion 2032 includes two bending portions 20321, and the opening directions of the two bending portions 20321 are opposite to each other. Absolutely, in other alternative embodiments, it is also possible that there can also be more than two bending portions 20321, the opening directions of two connected adjacent bending portions 20321 are opposite to each other. A damping member 2033 is arranged in the bending portion 20321. It is also possible that the damping member 2033 can be arranged at the inner surface of the bending portion 20321 close to the adjacent two elastic arms 2032, and can also be arranged in the bending portion closest to the vibrator side. When the vibration motor is vibrating, the elastic component 203 will press or release the damping member, so as to achieve the function of system damping adjustment.

In an embodiment, there are four elastic components 203 in total, which are grouped in pair and arranged at two sides of the vibrator. Two elastic components 203 at the same side are arranged in stagger up and down, and the bending portions 20321 of the two elastic components 203 up and down are arranged correspondingly, that is, the two adjacent elastic components 203 at the same side of the vibrator are arranged in central symmetry. Thus, it is possible to improve fixing stability of the elastic component 203 and the vibrator 202, so as to further improve vibration performance of the vibrator 202.

The present disclosure adopts an elastic component of a new type vibration motor, filling the bending portion of the deforming portion with a damping member can adjust system damping characteristic on the basis of guaranteeing vibrator weight, so as to improve product reliability.

Although the embodiments have been described and explained, it should be understood that, the above embodiments are only exemplary, which cannot limit the present disclosure. Those skilled in the art can make modifications, alternations and replacements within the scope of the present disclosure.

What is claimed is:

1. A vibration motor, comprising:
a shell having accommodating space;
a driving device accommodated in the accommodating space;
a vibrator; and
an elastic component elastically supporting the vibrator;
wherein the elastic component comprises a first fixing portion, a second fixing portion and a deforming portion; the first fixing portion is connected with the shell, the second fixing portion is connected with the vibrator, and the deforming portion connects the first fixing portion with the second fixing portion;
the deforming portion comprises at least two elastic arms and a bending portion; the bending portion is shaped in an arc structure and connects two adjacent elastic arms; the deforming portion comprises at least two bending portions, opening directions of adjacent two bending portions are opposite to each other; a damping member is arranged at an inner surface of the bending portion close to the two adjacent elastic arms.

2. The vibration motor as described in claim 1, wherein the damping member is arranged at least in a bending portion closest to the vibrator.

3. The vibration motor as described in claim 1, wherein one of the vibrator and the driving device comprises a magnet, the other one of the vibrator and the driving device comprises a coil; the vibrator further comprises a weight, the second fixing portion is fixed on the weight; in the vibrator, the magnet or the coil are fixed with the weight.

4. The vibration motor as described in claim 3, wherein the driving device is a coil fixed on the shell, the vibrator comprises a magnet arranged opposite to the coil, the magnet and the coil interact with each other so as to drive the vibrator to vibrate along a direction parallel to a bottom surface of the shell.

5. The vibration motor as described in claim 4, wherein a through hole is defined on the weight, the through hole corresponds to the magnet, and the magnet is fixed in the through hole.

6. The vibration motor as described in claim 5, wherein the driving device further comprises an iron core fixed in the shell, the coil is arranged by winding the iron core so as to form an electromagnet together with the iron core, and the electromagnet extends to the through hole correspondingly; the weight comprises an inner wall defining the through hole, and the magnet is fixed at the inner wall and is opposite to the coil.

7. The vibration motor as described in claim 5, wherein the elastic component is symmetrically arranged at two sides of the vibrator, at least two elastic components are stacked at a same edge of the vibrator along a direction perpendicular to the bottom surface, the first fixing portions of two adjacent elastic components are respectively fixed at two ends of the same edge.

8. The vibration motor as described in claim 5, wherein the two adjacent elastic components located at the same edge of the vibrator are arranged in central symmetry.

* * * * *